(12) United States Patent
Ku et al.

(10) Patent No.: US 8,194,812 B1
(45) Date of Patent: Jun. 5, 2012

(54) APPARATUS AND METHOD FOR SAMPLING A DATA SIGNAL IN A MANNER INDEPENDENT OF A HOLD TIME OF THE DATA SIGNAL

(75) Inventors: Ting-Sheng Ku, San Jose, CA (US); Ashfaq R. Shaikh, San Jose, CA (US); Rajesh Anantharaman, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1475 days.

(21) Appl. No.: 11/689,955

(22) Filed: Mar. 22, 2007

(51) Int. Cl.
*H04L 7/00* (2006.01)
(52) U.S. Cl. .......... 375/355; 375/316; 375/354; 365/93; 365/193; 365/194
(58) Field of Classification Search .................. 375/316, 375/354, 355; 365/93, 193, 194
See application file for complete search history.

(56) References Cited

U.S. PATENT DOCUMENTS

2006/0091912 A1* 5/2006 Ghosh et al. .................... 326/93
2006/0215467 A1* 9/2006 Partsch ......................... 365/194

* cited by examiner

*Primary Examiner* — Leon Flores
(74) *Attorney, Agent, or Firm* — Zilka-Kotab, PC

(57) ABSTRACT

A data sampling apparatus and associated method are provided, including a first inverter receiving a data signal, and inverting the data signal to produce a trigger signal, a first flip-flop receiving the trigger signal, and outputting an output signal, a second flip-flop and a third-flop flop each receiving the output signal from the first flip-flop, the second flip-flop further receiving a strobe signal, and a second inverter inverting the strobe signal, and outputting the inverted strobe signal to the third flip-flop. An output of the second flip-flop indicates a value of the output signal output from the first flip-flop when the strobe signal is of a first state and an output of the third flip-flop indicates a value of the output signal output from the first flip-flop when the strobe signal is of a second state.

25 Claims, 6 Drawing Sheets

APPARATUS AND METHOD FOR SAMPLING A DATA SIGNAL IN A MANNER INDEPENDENT OF A HOLD TIME OF THE DATA SIGNAL

FIELD OF THE INVENTION

The present invention relates to circuits, and more particularly to sampling circuits.

BACKGROUND

Prior art FIG. 1 illustrates both a strobe signal 102 and a data signal 104 for use in association with a typical sampling circuit. In use, the strobe signal 102 (e.g. signal edge, etc.) of the sampling circuit serves as a clock event for triggering the sampling of the data signal 104. Typically, such sampling circuit includes a flip-flop or the like for carrying out such sampling functionality.

In order to operate correctly, the data signal 104 typically exhibits a setup time 106 and a hold time 108, in the manner shown. In particular, the setup time 106 represents a time relative to the strobe signal 102 during which the data signal 104 to the sampling circuit (or component thereof) must remain stable in order to ensure that the sampled output is correct. Similarly, the hold time 108 represents a time following the strobe signal 102 during which the data signal 104 to the sampling circuit (or component thereof) must remain stable in order to guarantee the correct sampled output.

The foregoing setup/hold time constraints typically mandate a "minimum time budget" that must be allocated in association with the data signal 104. Such minimum time budget, in turn, constrains a rate at which the data signal 104 may be sampled, thus making it difficult to increase the speed of an associated system.

SUMMARY

A data sampling apparatus and associated method are provided in use, a data sampling, circuit is provided which is capable of sampling a data signal in a manner independent of a hold time of the data signal.

DETAILED DESCRIPTION

Figure 1:
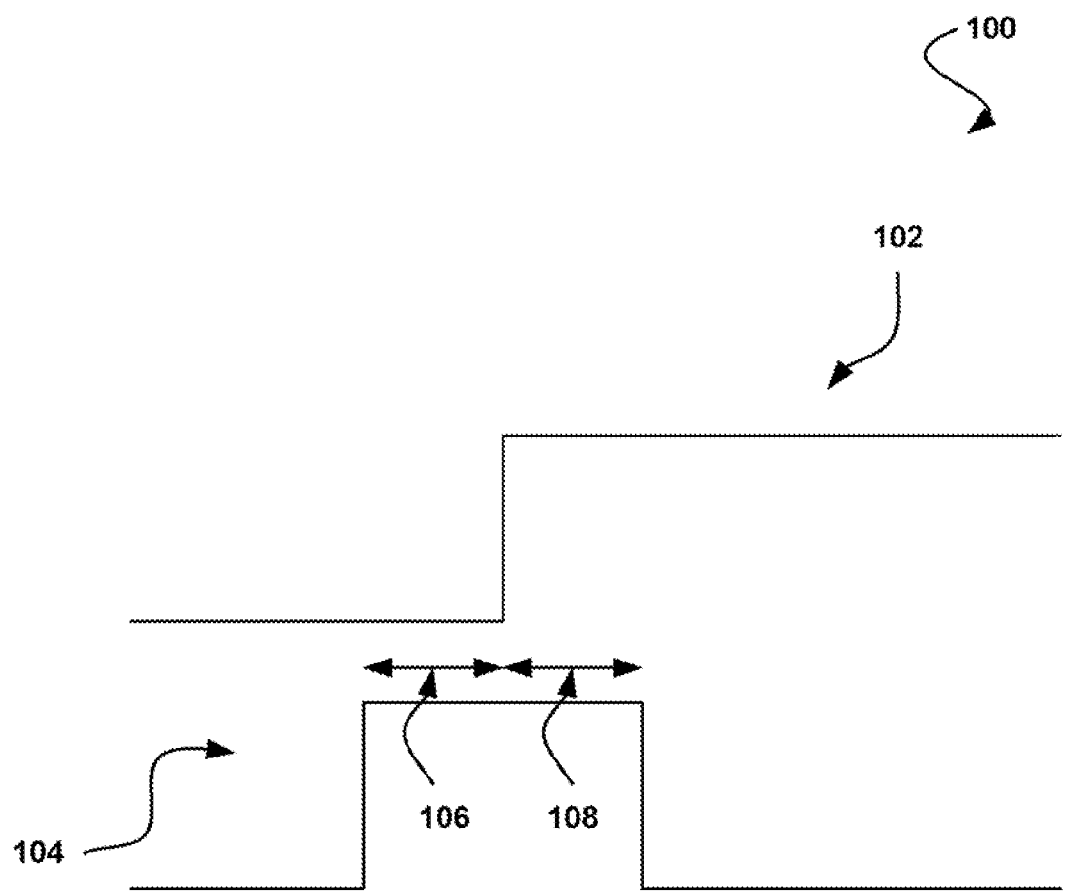
FIG. 1 shows a timing diagram illustrating the operation of a typical data sampling circuit, in accordance with the prior art.
Figure 2:
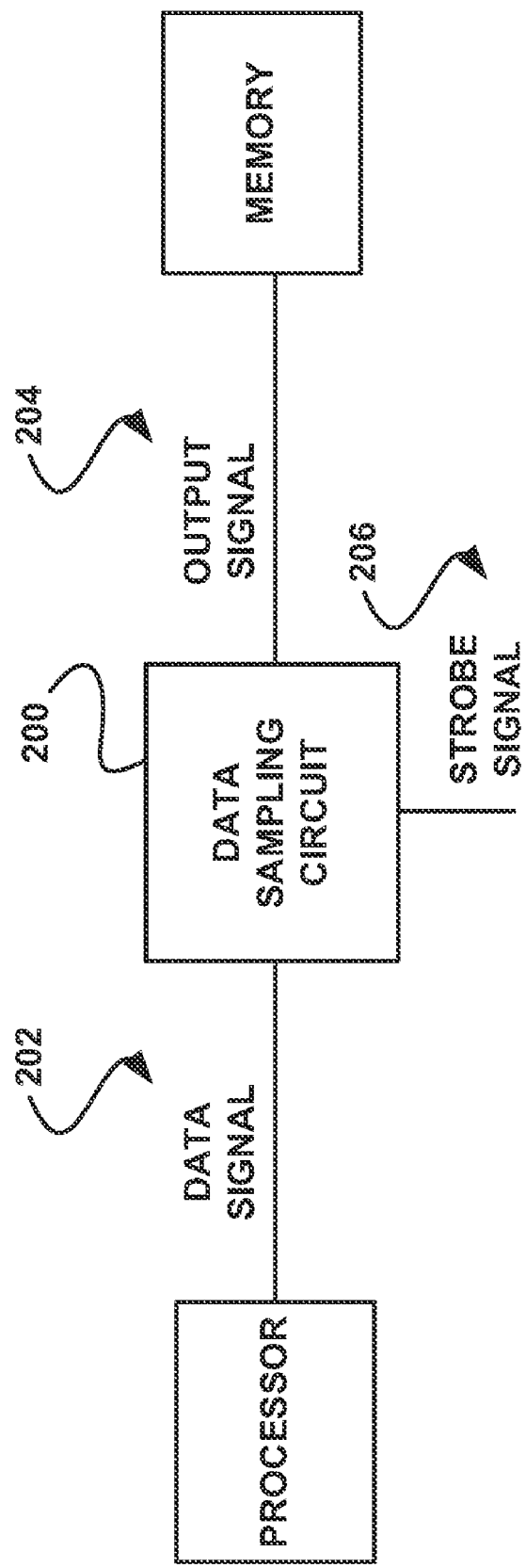
FIG. 2 shows a data sampling circuit for sampling a data signal, in accordance with one embodiment.

FIG. 2 shows a data sampling circuit 200 for sampling a data signal 202, in accordance with one embodiment. As shown, the data sampling circuit 200 is adapted for receiving the data signal 202 and further sampling such data signal 202 for producing an output signal 204. In use, such data sampling circuit 200 is capable of sampling the data signal 202 in a manner independent of a hold time of the data signal 202.

Such operation may be accomplished in any desired manner. For example, in one possible embodiment, a duration of the data signal 202 may be extended. To this end, any actual hold time (albeit shortened, etc.) may not necessarily affect the sampling of the data signal 202. Such extension of the duration of the data signal 202 may be carried out in any desired manner. Just by way of example, the duration of the data signal 202 may be latched, or stored, such that the data signal 202 may be extended until a strobe signal 206 is received.

Of course, it should be understood that the sampling of the data signal 202 may be performed in any desired way that is, at least in part, independent of the hold time of the data signal 202. For example, in different embodiments, the data signal 202 may be sampled based on a previous data state of the data signal 202 this end; in various possible embodiments, the data signal 202 need not be necessarily required to (but may) comply with any relevant hold time constraint.

It should be also noted that the data sampling circuit 200 may be implemented in the context of any desired system. For example, the data signal 202 may be received from a memory interface, a processor (e.g. central, network, and/or graphics processor, etc.), and/or any other data signal source, for that matter. Further, an output of the data sampling circuit 200 may communicate the output signal 204 to a memory controller and/or any other system or component that is capable of further processing the same.

In one particular embodiment where the data sampling circuit 200 operates on data stored or to be stored in memory, such data sampling circuit 200 may serve to sample the data signal 202 in a way that translates a format thereof. For example, the data signal 202 may include a double data rate (DDR) memory data signal, and the output signal 204 of the data sampling circuit 200 may include a single data rate (SDR) memory data signal. In other embodiment, no such translation need be performed. By way of example, the data signal 202 may include a SDR memory data signal, and the output signal 204 of the data sampling circuit 200 may also include a SDR memory data signal.

Figure 3:
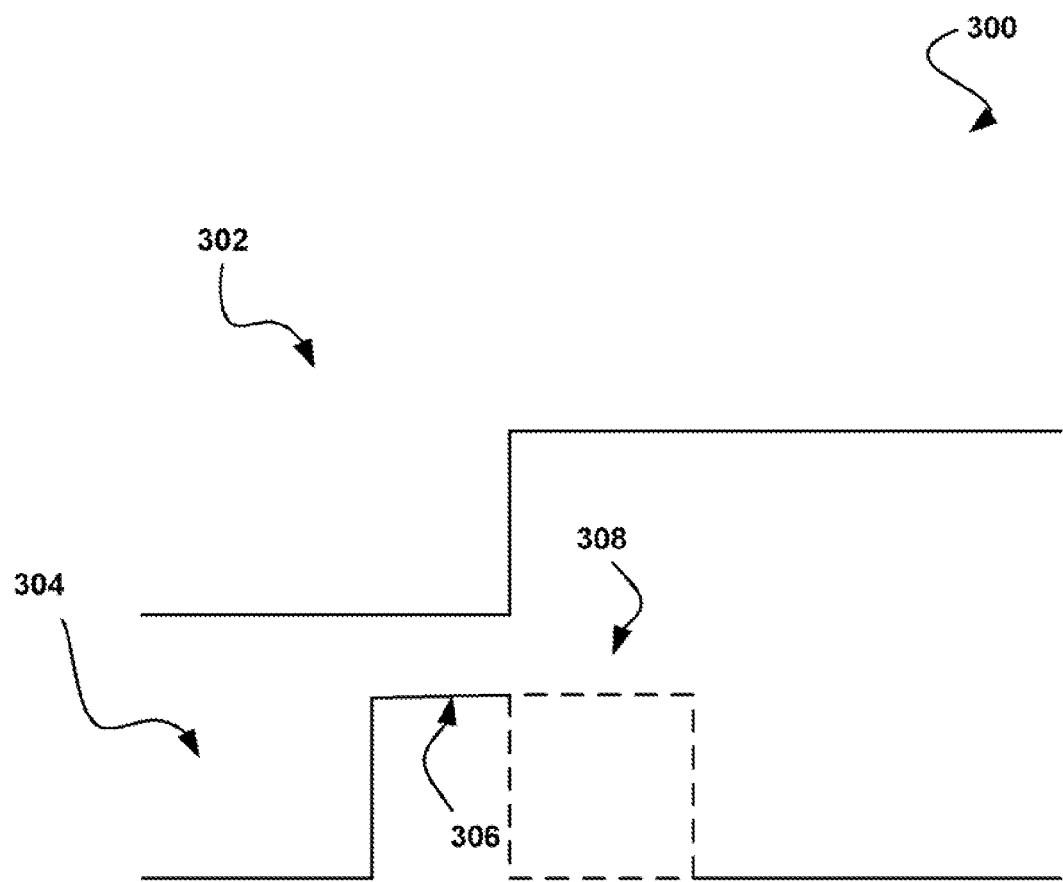
FIG. 3 shows a timing diagram illustrating the operation of a data sampling circuit, in accordance with another embodiment.

FIG. 3 shows a timing diagram 300 showing the operation of a data sampling circuit, in accordance with another embodiment. As an option, the operation reflected in the timing diagram 300 may represent operation of the data sampling circuit 200 of FIG. 2. As shown, a strobe signal 302 is shown to pulse, after a data signal 304 has achieved a minimum set up time 306. As mentioned earlier, the data signal 304 is sampled independent of any specific hold time 308, or lack thereof.

By this feature, a minimum time budget and associated constraints corresponding with the data signal 304 may be relaxed, or reduced, such that more data may be communicated via the data signal 304 over a given amount of time. Thus, in some embodiments, a speed with which data is communicated and sampled may potentially be increased.

In various embodiments, the data signal 304 may be sampled based on the strobe signal 302, where an edge of the data signal 304 may be asynchronous with respect to an edge of the strobe signal 302. Further, in different embodiments, the data signal 304 may be sampled based on only the edge of the data signal 304, without necessarily taking into consideration a level associated therewith.

More illustrative information will now be set forth regarding various optional architectures and features with which the foregoing framework may or may not be implemented, per the desires of the user. Thus, it should be strongly noted that the following information is set forth for illustrative purposes and should not be construed as limiting in any manner. Any of the following features may be optionally incorporated with or without the exclusion of other features described.

Figure 4:
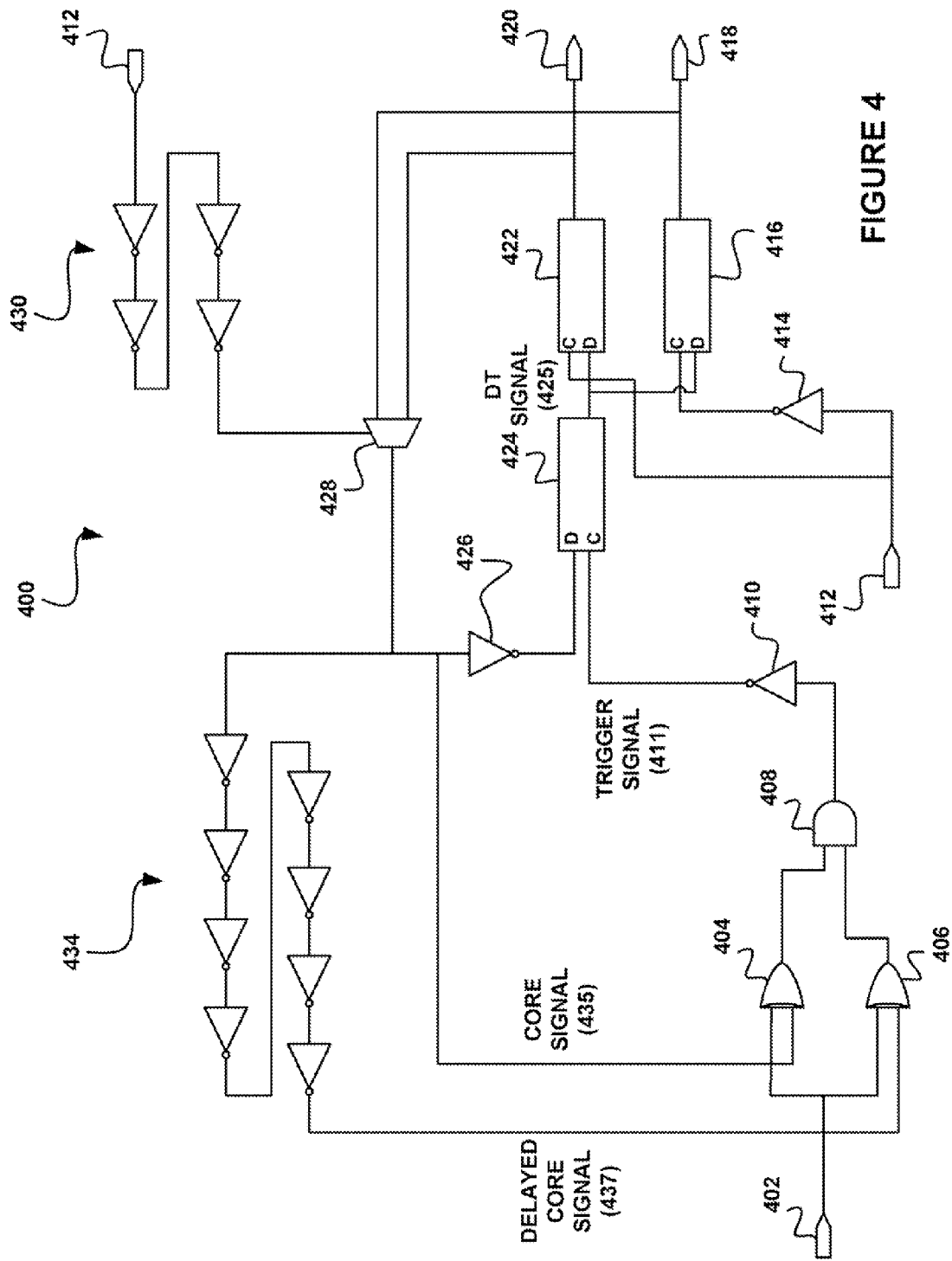
FIG. 4 shows a data sampling circuit for sampling a data signal, in accordance with another embodiment.

FIG. 4 shows a data sampling circuit 400 for sampling a data signal, in accordance with another embodiment. As an option, the sampling circuit 400 may be implemented in the context of the structure and/or functionality set forth during the description of the previous figures. Of course, however, the data sampling circuit 400 may be implemented in any desired environment. Further, the previously mentioned definitions equally apply to the description of the present embodiment.

As shown, a data signal 402 feeds first inputs of a first XOR gate 404 and a second XOR gate 406, which in turn have outputs coupled to respective inputs of a NAND gate 408, in the manner shown. Coupled to an output of the NAND gate 408 is a first inverter 410 which feeds a control input of a first flip-flop 424.

In use, the first XOR gate 404 and the second XOR gate 406 serve to both output a logic "1" when the respective inputs thereof are different (e.g. "1" and "0"), in which case, a logic "0" is present at the output of the NAND gate 408. In such case, the logic "0" that is present at the output of the NAND gate 408 is inverted to a logic "1" by the first inverter 410, which outputs a trigger signal 411 for the control input of the first flip-flop 424.

Of course, the first XOR gate 404, second XOR gate 406, NAND gate 408, first inverter 410, etc. are set forth for illustrative purposes only and should not be construed as limiting in any manner. For example, any logic circuit may be employed which is adapted for carrying, out the abovementioned or similar functionality (to be elaborated upon later).

With continuing reference to FIG. 4, an output (e.g. DT signal 425) of the first flip-flop 424 feeds data inputs of a second flip-flop 422 and a third flip-flop 416, Control inputs of the second flip-flop 422 and the third flip-flop 416 are fed by a strobe signal 412. It should be noted that the strobe signal 412 is inverted by a second inverter 414 before being fed to the control input of the third flip-flop 416.

During operation, outputs of the second flip-flop 422 and the third nip-flop 416 serve as outputs 420, 418 of the circuit 400 and show the value of the output of the first flip-flop 424 when the respective control input is a logic "1." Thus, the output 418 will reflect the value of the output of the first flip-flop 424 when the strobe signal 412 is a logic "0," while the output 420 will reflect the value of the output of the first flip-flop 424 when the strobe signal 412 is a logic "1."

As further shown, the outputs 418, 420 of the pair of the flip-flops 416, 422 are fed back to the logic circuit (e.g. the first XOR gate 404, second XOR gate 406, NAND gate 408, first inverter 410, etc.) for arming and triggering the first flip-flop 424. In particular, the outputs 418, 420 are fed to a multiplexer 428 that is under the control of the strobe signal 412, which is delayed by a delay circuit 430. In the embodiment shown, the delay circuit 430 includes a string of 4 inverters. It should be noted, however, that the delay circuit 430 may include any desired circuit capable of similar functionality.

During use, the multiplexer 428 works to communicate one of the outputs 418, 420 of the pair of flip-flops 416, 422 as a function of the delayed strobe signal 412. Such output is, in turn, fed to a data input of the first flip-flop 424 via a third inverter 426. Further, the output of the multiplexer 428 is further communicated via a core signal 435 and delayed core signal 437. See delay circuit 434. In the embodiment shown, the delay circuit 434 includes a string of 8 inverters. It should be noted, however, that the delay circuit 434 may include any desired circuit capable of similar functionality.

During operation, the circuit 400 allows the data signal 402 to be sampled independent of any hold time associated therewith. More information regarding such overall operation of the sampling circuit 400 will be set forth in greater detail during reference to FIG. 5.

Figure 5:
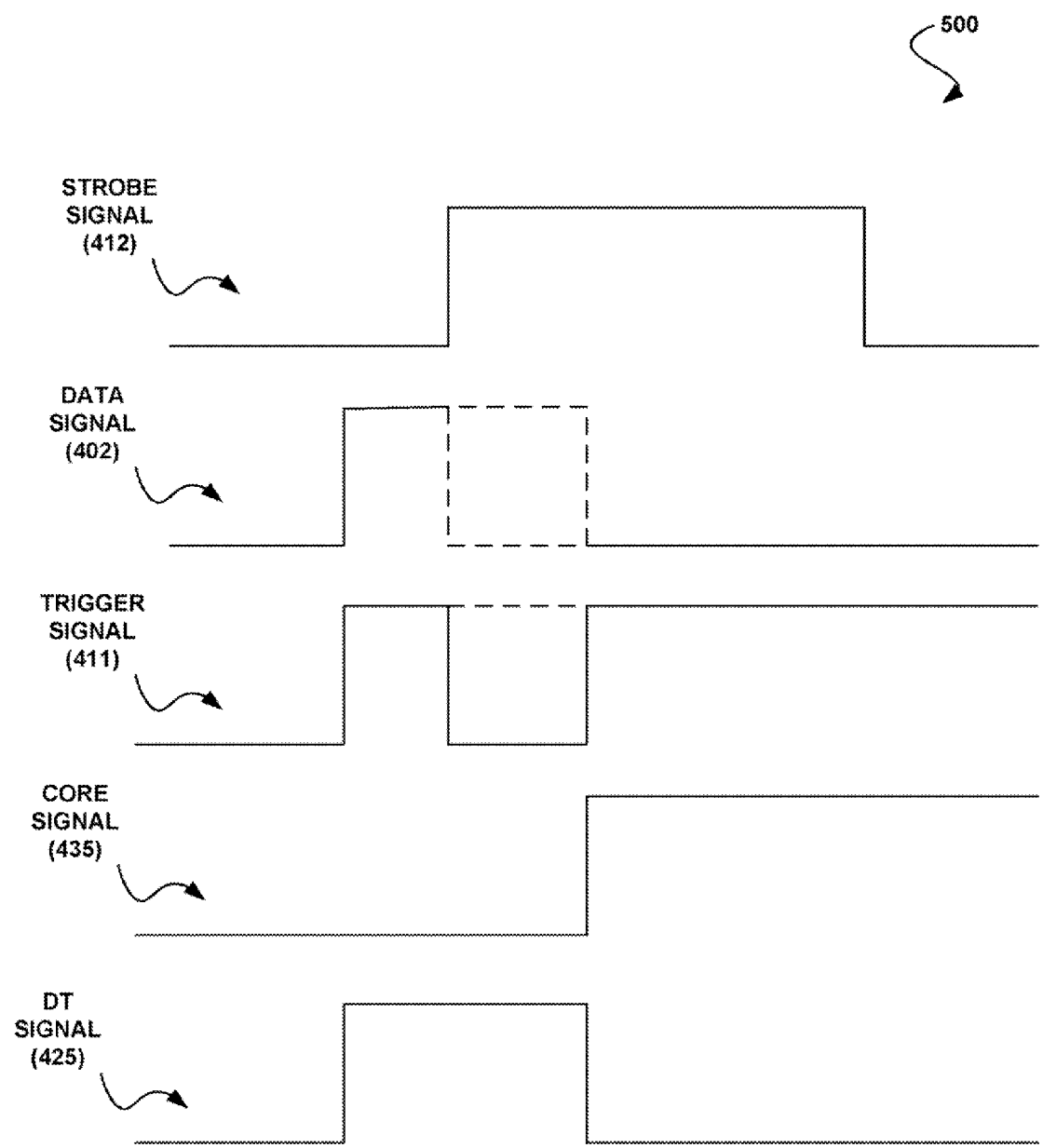
FIG. 5 shows a timing diagram illustrating the operation of a data sampling circuit, in accordance with another embodiment.

FIG. 5 shows a timing diagram 500 showing the operation of a data sampling circuit, in accordance with another embodiment. As an option, the operation reflected in the timing diagram 500 may represent operation of the data sampling circuit 400 of FIG. 4.

As shown, the data signal 402 begins by transitioning to a value (e.g. "0" to "1") that is different, from the core signal 435 (and the delayed core signal 437). This results in the data signal 402, and the core signal 435/delayed core signal 437 having different values at the inputs of the first XOR gate 404 and the second XOR gate 406, which, in turn, results in the NAND gate 408 and the first inverter 410 producing a positive edge on the trigger signal 411. Note the aforementioned respective signals in FIG. 5.

This pulse in the trigger signal 411 is input to the first flip-flop 424 in FIG. 4. By this feature, the positive edge of the trigger signal 411 latches the inverted value of the core signal 435 to form the DT signal 425 at the output of the first flip-flop 424. Note the trigger signal 411, core signal 435, and DT signal 425 in FIG. 5.

Thus, when the edge of the strobe signal 412 arrives at one of the pair of flip-flops 416, 422, the value of the DT signal 425 is sampled and placed on the outputs 418, 420 of FIG. 4, depending on whether the edge of the strobe signal 412 is positive or negative. As an example and as shown in FIG. 5, the first edge of the strobe signal 412 is positive, thus causing the DT signal 425 to arrive at the output 420 of FIG. 4.

In order for the value of the DT signal 425 to subsequently change from high to low as shown in FIG. 5, the trigger signal 411 is shown to undergo two transitions; a negative edge transition to "arm" the first flip-flop 424, and a positive edge transition to "trigger" the first flip-flop 424.

In the present embodiment, arming and triggering the first flip-flop 424 can happen in different ways. In one instance, the data signal 402 transitions to a different value (e.g. "1" to "0") before the core signal 435 and the delayed core signal 437 stabilize to the original value of the data signal 402 (e.g. "1"). Such transition causes the data signal 402 and the core signal 435/delayed core signal 437 to have the same values at the inputs of the first XOR gate 404 and the second XOR gate 406, for example. In this case, the output signal from the NAND gate 408 becomes a logic "1," causing a negative edge on the trigger signal 411, which arms the first flip-flop 424.

Once the first flip-flop 424 is armed in the manner described, triggering the first flip-flop 424 takes place when the core signal 435 and the delayed core signal 437 stabilize to the new value (e.g. "1"). Such transition causes the data signal 402 and the core signal 435/delayed core signal 437 to have different values at the inputs of the first XOR gate 404 and the second XOR gate 406. Such difference, in turn, causes the output signal of the NAND gate 408 to become a logic "0," causing a positive edge on the trigger signal 411, which triggers the first flip-flop 424.

In another instance, arming the first flip-flop 424 can be accomplished when the data signal 402 remains constant (e.g. "1") and the core signal 435 and the delayed core signal 435 stabilize to this value, thus creating the same values at the inputs of the first XOR gate 404 and the second XOR gate 406, in this case, the output signal from NAND gate 408 becomes a logic creating a negative edge on the trigger signal 411, which arms the first flip-flop 424.

Once the first flip-flop 424 is armed in the manner described, triggering, the first flip-flop 424 takes place when the data signal 412 changes to a new value (e.g. "0"), thus creating different values at the inputs of the first XOR gate 404 and the second XOR gate 406. Such difference causes the output signal from NAND gate 408 to become a logic "0," creating a positive edge on the trigger signal 411 which triggers the first flip-flop 424.

In either case described, the positive edge of the trigger signal 411 latches the inverted value of the core signal 435 to form the DT signal 425. When the edge of the strobe signal 412 arrives at one of the pair of flip-flops 416, 422, the value of the DT signal 425 is sampled and placed on the outputs 418, 420, depending on whether the edge of the strobe signal 412 is positive or negative. As an example, when the second edge of the strobe signal 412 is negative, the DT signal 425 is caused to arrive at the output 418 of FIG. 4.

Of course, the data sampling circuit 400 of FIG. 4 and associated timing diagram 500 of FIG. 5 are set forth for illustrative purposes only and should not be construed as limiting in any manner. For example, the timing diagram 500 or similar functionality may be accomplished in the context of any desired circuit environment.

Figure 6:
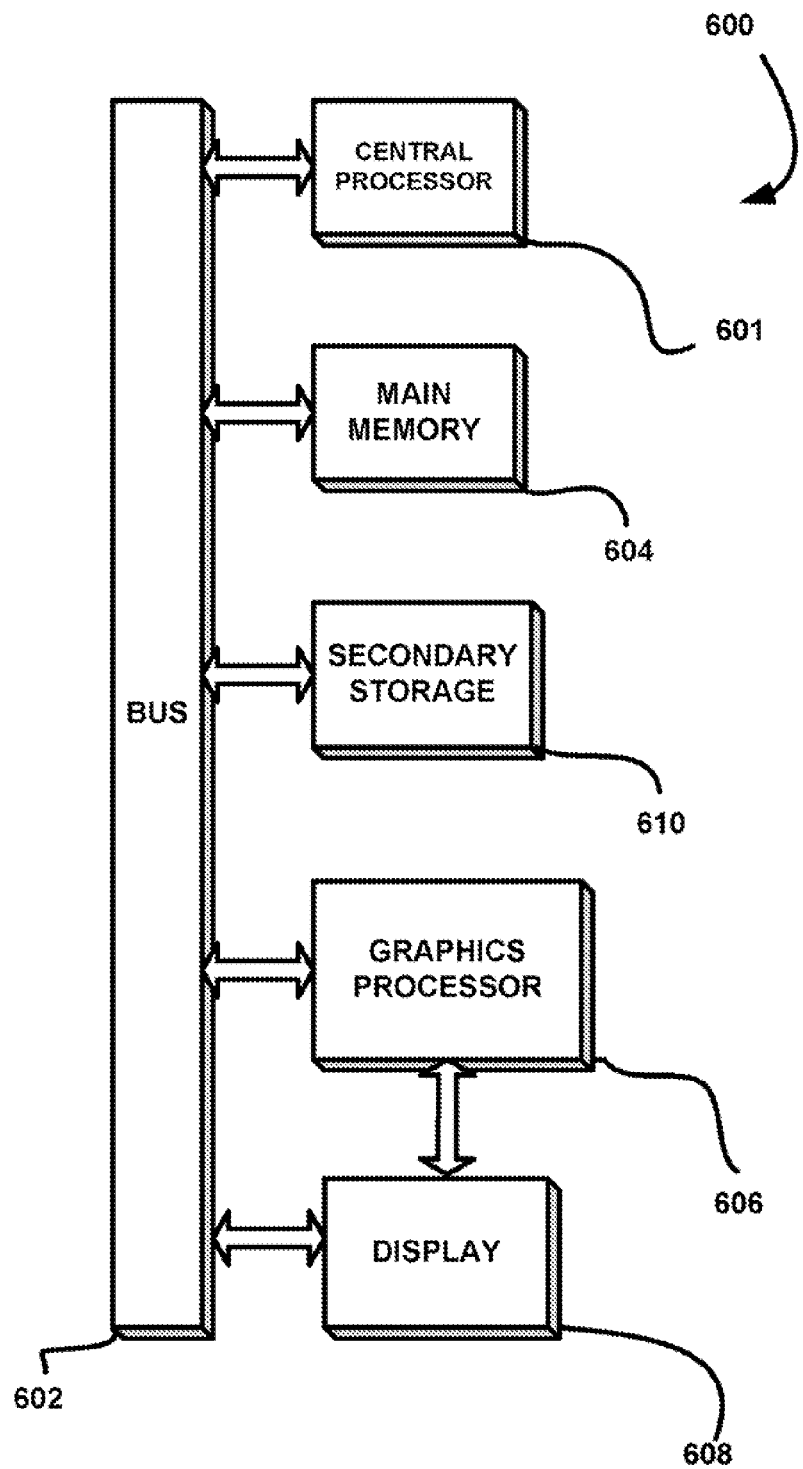
FIG. 6 illustrates an exemplary system in which the architecture and/or functionality of the various previous embodiments may be implemented.

FIG. 6 illustrates an exemplary system 600 in which the architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip, it should be noted that the term single semiconductor platform may also refer to multi chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, etc. Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a data sampling circuit comprising:
a first inverter receiving a data signal, and inverting the data signal to produce a trigger signal,
a first flip-flop receiving the trigger signal, and outputting an output signal,
a second flip-flop and a third-flop flop each receiving the output signal from the first flip-flop, the second flip-flop further receiving a strobe signal, and
a second inverter inverting the strobe signal, and outputting the inverted strobe signal to the third flip-flop;
wherein an output of the second flip-flop indicates a value of the output signal output from the first flip-flop when the strobe signal is of a first state;
wherein an output of the third flip-flop indicates a value of the out signal output from the first flip-flop when the strobe signal is of a second state;
wherein the data sampling circuit samples the data signal in a manner independent of a hold time of the data signal.

2. The apparatus of claim 1, wherein a duration of the data signal is extended.

3. The apparatus of claim 2, wherein the duration of the data signal is extended independent of a transition of the data signal.

4. The apparatus of claim 2, wherein the duration of the data signal is extended by latching the data signal.

5. The apparatus of claim 2, wherein the duration of the data signal is extended until the strobe signal is received.

6. The apparatus of claim 1, wherein the data signal is not required to comply with a hold time constraint.

7. The apparatus of claim 1, wherein the data signal is sampled based on a previous data state of the data signal.

8. The apparatus of claim 1, wherein both the output of the second flip-flop and the output of the third-flip flop are fed back to a logic circuit for triggering the first flip-flop.

9. The apparatus of claim 8, wherein at least one of the output of the second flip-flop and the output of the third-flip flop is fed back to the logic circuit upon receipt of a delayed strobe signal at a multiplexer.

10. The apparatus of claim 9, wherein both the output of the second flip-flop and the output of the third flip-flop are input to the multiplexer, and the at least one of the output of the second flip-flop and the output of the third flip-flop that is fed back to the logic circuit upon receipt of a delayed strobe signal is outputted from the multiplexer upon receipt of the delayed strobe signal at the multiplexer, the delayed strobe signal having a same source as the strobe signal.

11. The apparatus of claim 10, wherein the output of the multiplexer is inverted at a second inverter, and output from the second inverter is provided as input to the first flip-flop receiving the trigger signal from the first inverter.

12. The apparatus of claim 11, wherein the output of the multiplexer is further provided as input to a first XOR gate.

13. The apparatus of claim 12, wherein the output of the multiplexer is further delayed and provided as input to a second XOR gate.

14. The apparatus of claim 13, wherein both of an output of the first XOR gate and an output of the second XOR gate are provided as input to a NAND gate, and the NAND gate outputs the data signal received by the first inverter.

15. The apparatus of claim 8, wherein a delay is incorporated with the at least one of the output of the second flip-flop and the output of the third-flip flop that is fed back to the logic circuit.

16. The apparatus of claim 1, wherein the data signal includes a single data rate (SDR) memory data signal.

17. The apparatus of claim 16, wherein an output of the data sampling circuit includes an SDR memory data signal.

18. The apparatus of claim 1, wherein the data signal includes a double data rate (DDR) memory data signal.

19. The apparatus of claim 18 wherein an output of the data sampling circuit includes a single data rate (SDR) memory data signal.

20. The apparatus of claim 1, wherein the data signal is received from at least one of a memory interface and a processor.

21. The apparatus of claim 1, wherein an output of the data sampling circuit communicates with a memory controller.

22. A method for sampling a data signal, comprising:
receiving a data signal at a first inverter and inverting the data signal to produce a trigger signal;
receiving the trigger signal at a first flip-flop and outputting an output signal;
receiving the trigger signal from the first flip-flop at each of a second flip-flop and a third-flop flop;
receiving a strobe signal at the second flip-flop;
inverting the strobe signal at a second inverter; and
outputting the inverted strobe signal to the third flip-flop;
wherein an output of the second flip-flop indicates a value of the output signal output from the first flip-flop when the strobe signal is of a first state;
wherein an output of the third flip-flop indicates a value of the output signal output from the first flip-flop when the strobe signal is of a second state;
wherein the sampling of the data signal is in a manner independent of a hold time of the data signal.

23. A method, comprising:
receiving a data signal including an edge and a level; and
sampling the data signal utilizing only the edge of the data signal by:
receiving a manipulation of the data signal at a first inverter, in response to receiving the edge of the data signal, and inverting the data signal to produce a trigger signal,
receiving the trigger signal at a first flip-flop and outputting an output signal,
receiving the output signal from the first flip-flop at each of a second flip-flop and a third-flop flop,
receiving a strobe signal at the second flip-flop,
inverting the strobe signal at a second inverter, and outputting the inverted strobe signal to the third flip-flop;
wherein an output of the second flip-flop indicates a value of the output signal output from the first flip-flop when the strobe signal is of a first state;
wherein an output of the third flip-flop indicates a value of the output signal output from the first flip-flop when the strobe signal is of a second state.

24. A method, comprising:
receiving a data signal including a data signal edge; and
sampling the data signal based on a strobe signal including a strobe signal edge by:
in response to receiving the data signal edge, manipulating the data signal, receiving the manipulation of the data signal at a first inverter and inverting the manipulated data signal to produce a trigger signal,
receiving the trigger signal at a first flip-flop and outputting an output signal,
receiving the output signal from the first flip-flop at each of a second flip-flop and a third-flop flop,
receiving the strobe signal including the strobe signal edge at the second flip-flop,
inverting the strobe signal at a second inverter, and outputting the inverted strobe signal to the third flip-flop;
wherein an output of the second flip-flop indicates a value of the output signal output from the first flip-flop when the strobe signal is of a first state;
wherein an output of the third flip-flop indicates a value of the output signal output from the first flip-flop when the strobe signal is of a second state;
wherein the data signal edge is asynchronous with respect to the strobe signal edge.

25. A system, comprising:
a processor operable to access memory; and
a data sampling circuit coupled between the processor and the memory for sampling a data signal by:
receiving the data signal a first inverter and inverting the data signal to produce a trigger signal,
receiving the trigger signal at a first flip-flop and outputting an output signal,
receiving the output signal from the first flip-flop at each of a second flip-flop and a third-flop flop,
receiving a strobe signal at the second flip-flop,
inverting the strobe signal at a second inverter, and outputting the inverted strobe signal to the third flip-flop;
wherein an output of the second flip-flop indicates a value of the output signal output from the first flip-flop when the strobe signal is of a first state;
wherein an output of the third flip-flop indicates a value of the output signal output from the first flip-flop when the strobe signal is of a second state;
wherein the sampling of the data signal is in a manner-independent of a hold time of the data signal.

* * * * *

UNITED STATES PATENT AND TRADEMARK OFFICE
CERTIFICATE OF CORRECTION

PATENT NO. : 8,194,812 B1
APPLICATION NO. : 11/689955
DATED : June 5, 2012
INVENTOR(S) : Ku et al.

Page 1 of 1

It is certified that error appears in the above-identified patent and that said Letters Patent is hereby corrected as shown below:

In the claims:
Claim 1, col. 6, line 44; please replace "out" with --output--;
Claim 22, col. 7, line 46; please replace "trigger" with --output--;
Claim 25, col. 8, line 45; please insert --at-- before "a" and after "signal".

Signed and Sealed this
Fourth Day of December, 2012

David J. Kappos
*Director of the United States Patent and Trademark Office*